May 29, 1962 E. F. EGER 3,036,694
TURNTABLE ARTICLE DISTRIBUTING DEVICE
Filed Sept. 2, 1959 4 Sheets-Sheet 1

INVENTOR
E. F. EGER
By R. Gundersen
ATTORNEY

INVENTOR
E. F. EGER
By L. Gundersen
ATTORNEY

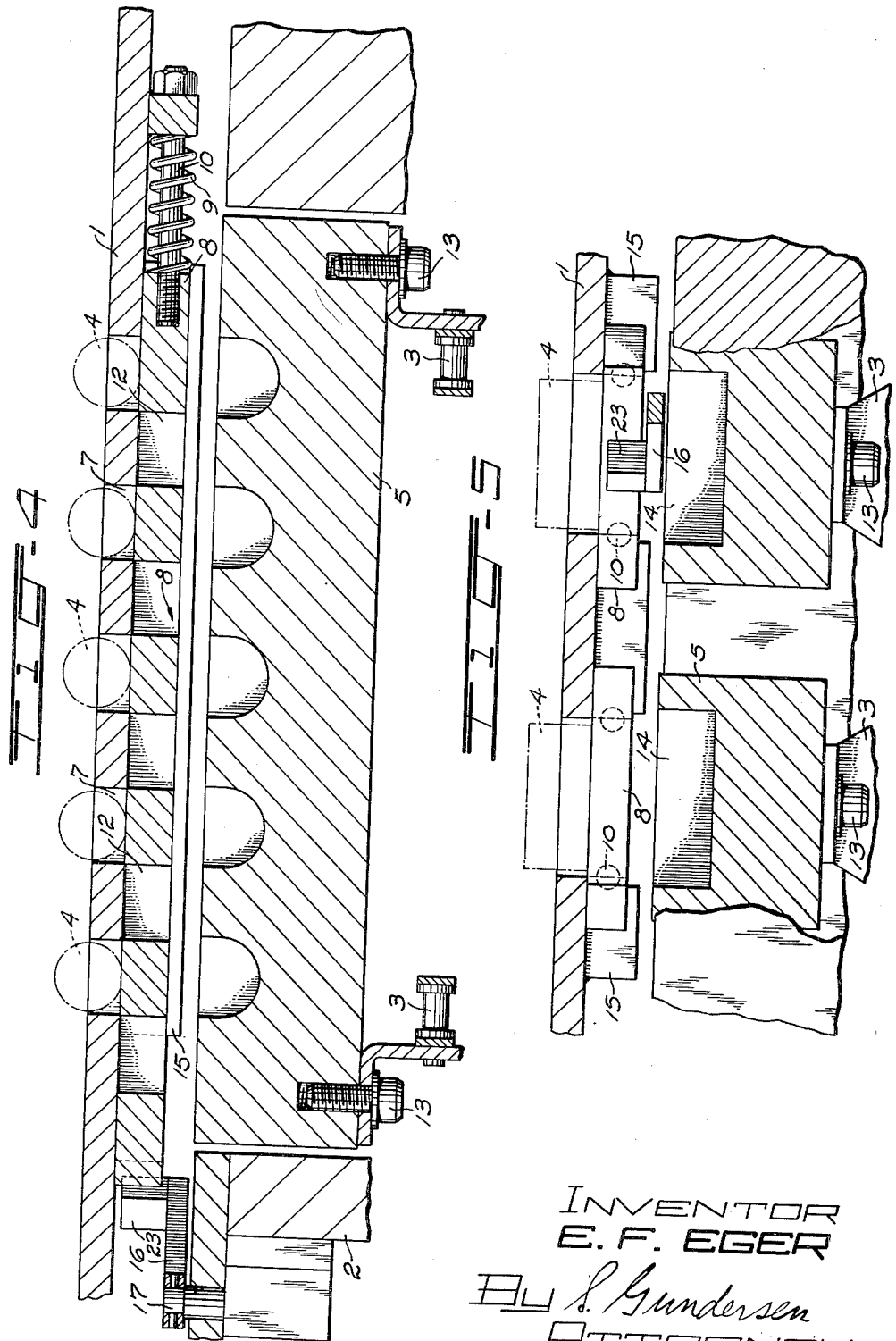

United States Patent Office 3,036,694
Patented May 29, 1962

3,036,694
TURNTABLE ARTICLE DISTRIBUTING DEVICE
Edward F. Eger, Indianapolis, Ind., assignor to Western Electric Company, Incorporated, New York, N.Y., a corporation of New York
Filed Sept. 2, 1959, Ser. No. 837,706
4 Claims. (Cl. 198—25)

This invention relates to article handling and more particularly to a perforated turntable for transporting and distributing articles.

As is well known a turntable device consists of a table which rotates about its axis. Such devices have been used to transport and distribute articles from one position adjacent to the table to one or more other adjacent positions. Generally such distribution has been accomplished by timed ejecting or sweeping levers pushing the articles from the table. Where more than one article is to be removed at a position adjacent to the table, it becomes difficult, especially if the articles are small, to remove exactly the desired number at one or more predetermined positions. No apparatus has been available which maintains the articles at some desired spaced relationship from each other at a removal position.

An object of this invention is apparatus capable of selecting an article from a mass of different sized articles and distributing the selected article to a removal station.

A further object of this invention is such apparatus which selects a predetermined number of articles for distribution to one, or a plurality, of removal stations.

A yet further object of this invention is apparatus for transferring a predetermined number of articles to one or more removal stations, and depositing the articles in a prearranged pattern at such station or stations.

In accordance with the above-mentioned objects, a perforated turntable having perforated article holders slidably mounted thereon rotates to transport articles from an article supply station to a plurality of removal stations where, by sliding the holders and thereby aligning the holder and turntable perforations, the articles drop out in a prearranged pattern.

Other objects will be apparent from the following detailed description, considered in conjunction with the accompanying drawings, wherein:

FIG. 4 is an elevational side view of a portion of the perforated turntable showing a spring-loaded article holder, supporting a number of articles, and a removal tray; and FIG. 5 is an elevational side view of a portion of the perforated turntable showing two article holders and two removal trays.

Figure 1:
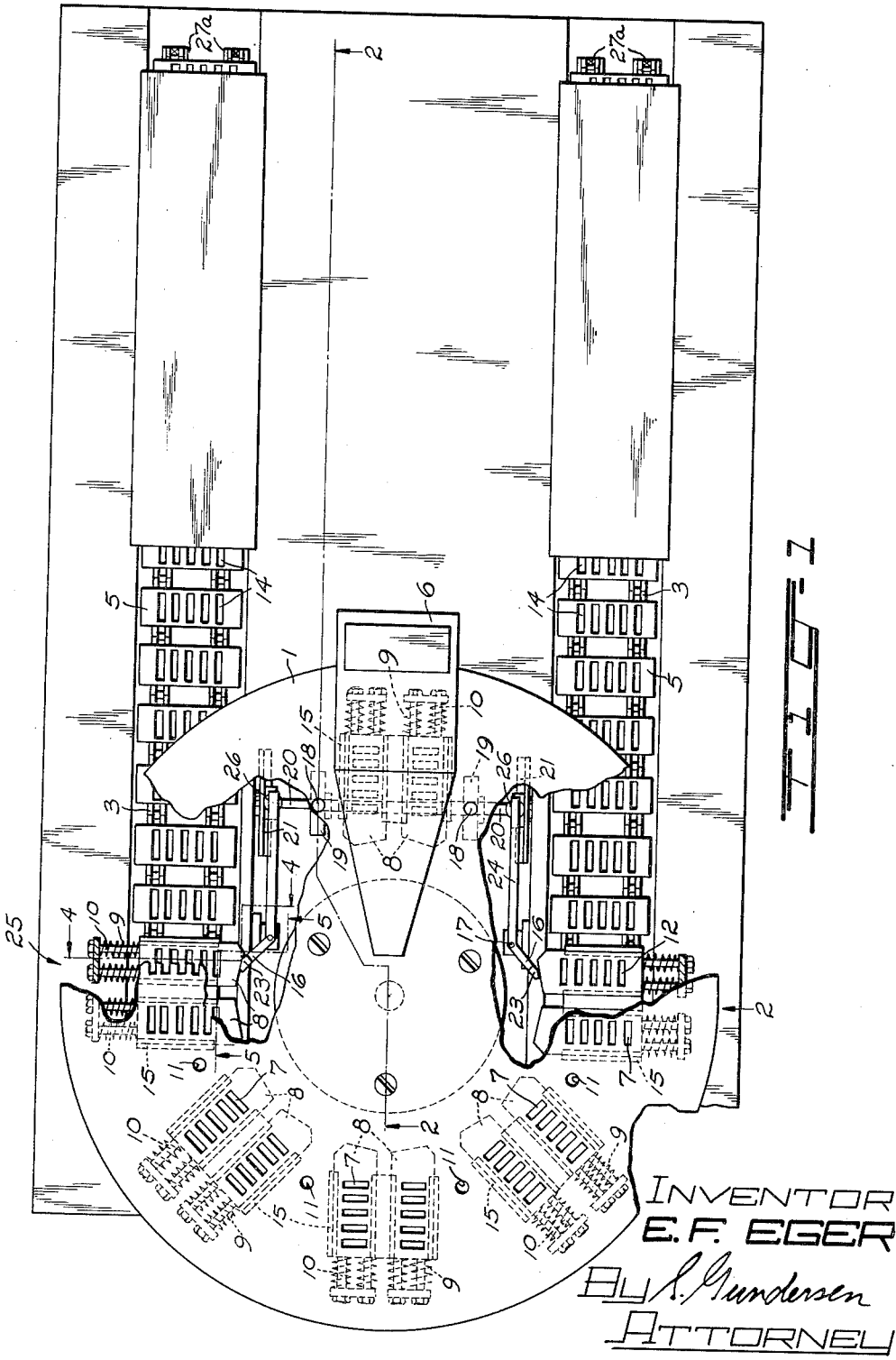
FIG. 1 is a top plan view of the device, showing the turntable with its associated supply hopper at its right side, and showing a pair of article removal conveyor belts.
Figure 2:
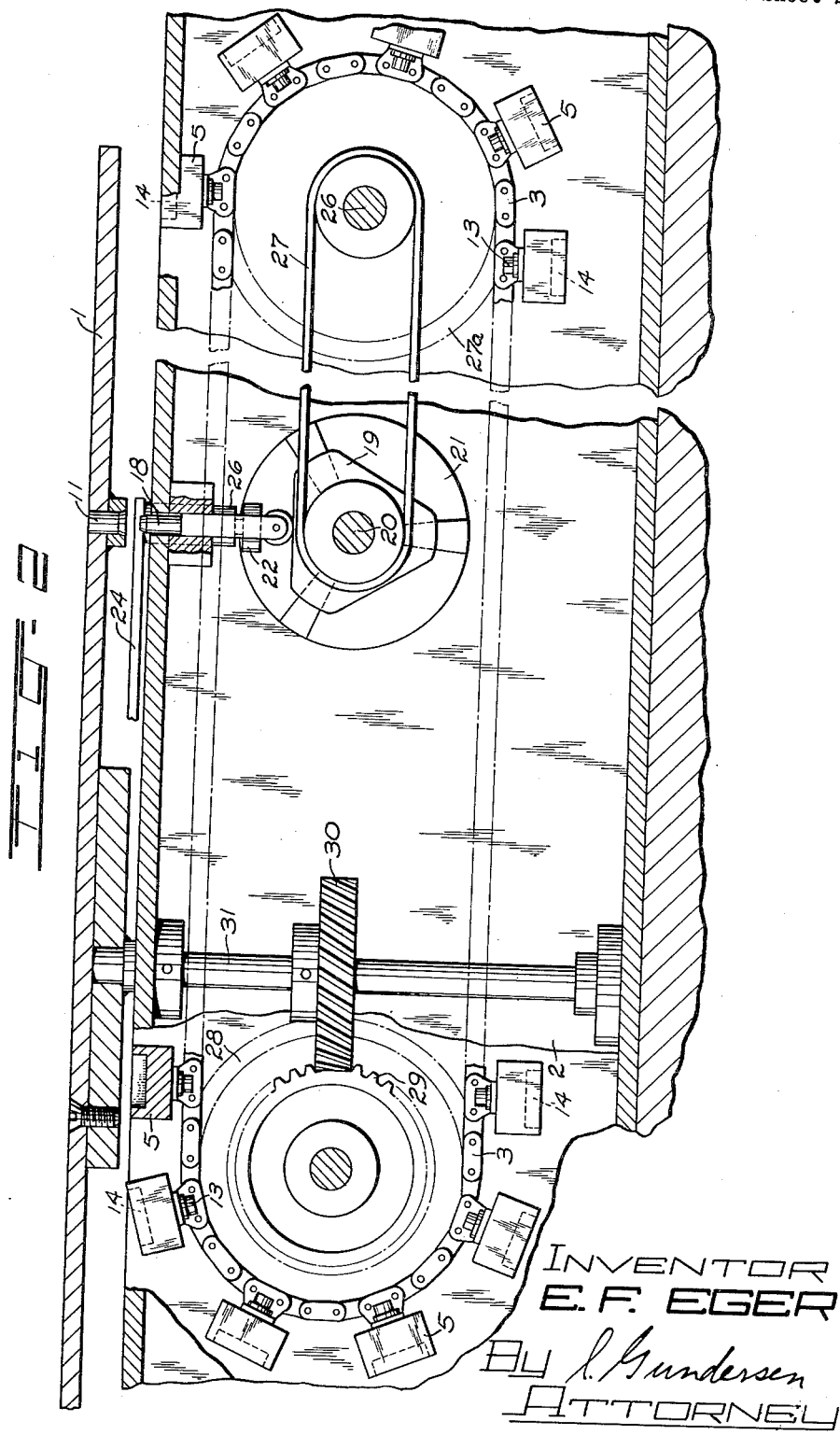
FIG. 2 is a side cut-away view of the turntable, an article holder and a conveyor belt driven on geared wheels.
Figure 3:
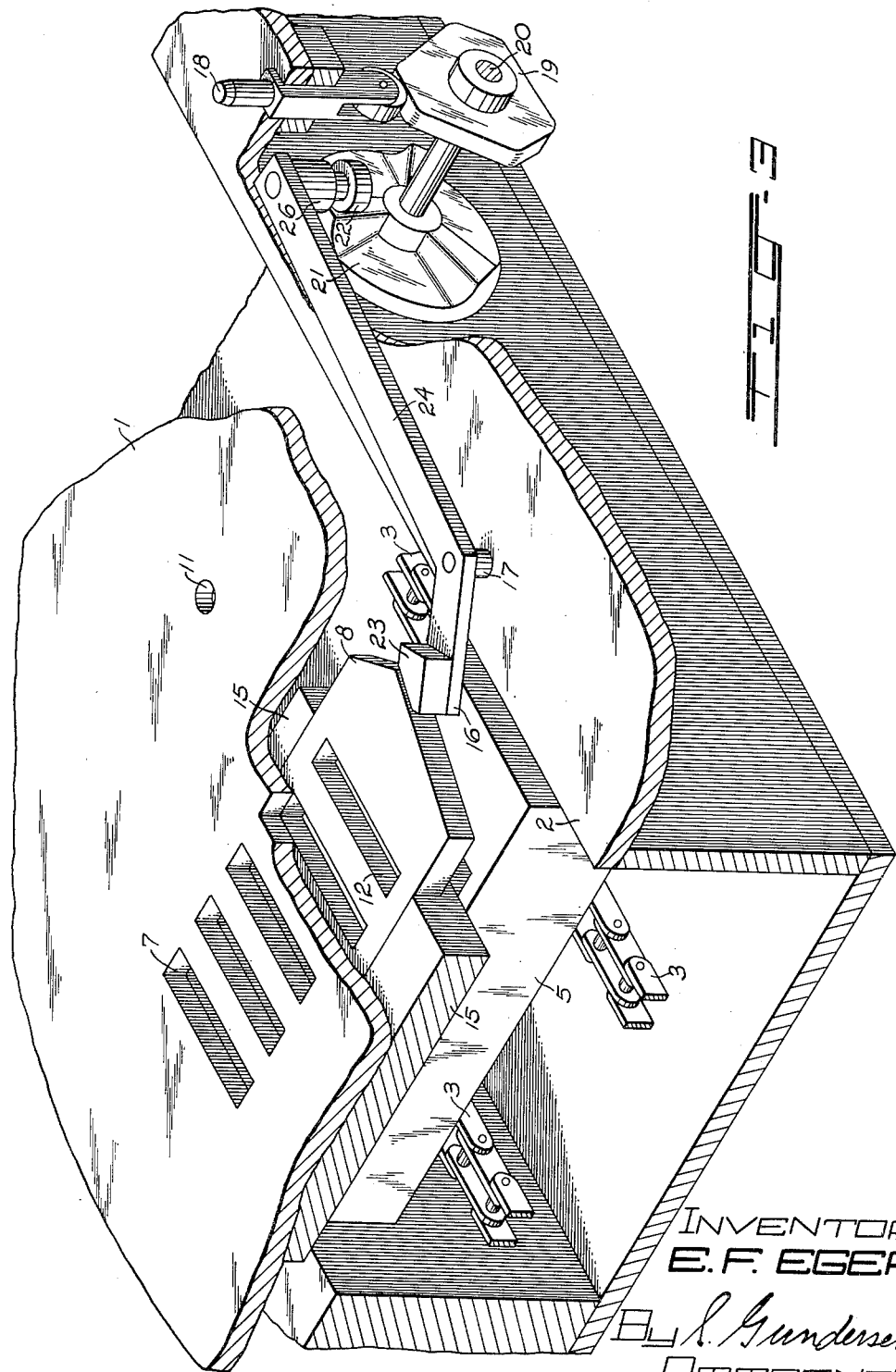
FIG. 3 is a cut-away perspective view of a portion of the turntable, illustrating the sliding movement of article holders actuated by a cam-operated actuator.

Referring to the drawing, in FIG. 1, turntable 1 is circular and driven about its axis. Preferably an indexing turntable which indexes 45° per motion at a rate of one revolution per minute is used. Turntable 1 is locked after each indexing step by means of holes 11 therein in cooperation with locking pin 18 (FIG. 2).

Removal stations 2 and 25 are at opposite sides of turntable 1 and consist of the starting positions of a pair of conveyor chains 3. Articles 4 are placed into the top of hopper 6 and by gravity, fall onto turntable 1 where they are loaded by hand or by a sweeper arm (not shown) into perforations 7 in turntable 1. These perforations are slightly larger than the articles desired to be transferred, permitting their ready egresss from the perforations by gravity. If mixed articles, of various sizes or shapes, are placed into hopper 6, only those articles of the desired size and shape which fit into predetermined perforations of turntable 1 will be selected and transferred. The unselected articles will remain on turntable 1 to be removed by hand or a sweeping arm (not shown). Perforations 7 are illustrated in FIG. 1, and subsequent figures as oblong and therefore adapted for small components, such as condenser bodies prior to joining of leads thereto.

Positioned beneath turntable 1 are article holders 8. Article holders 8 are individually spring-loaded by a pair of springs 9 and spring guides 10. Holders 8 are supported under turntable 1 on the flanges of guides 15 and are movable therein by forward and backward sliding motions. Article holders 8 are arranged, in a series of adjacent pairs, about the circumference of turntable 1. In FIG. 4 article holders 8 support articles 4 in perforations 7. When article holders 8 are positioned so that perforations 12 (in holders 8) are not aligned with perforations 7 (in turntable 1) articles 4 are supported on the level of the lower surface of the turntable 1. When article holders 8 are moved, at the removal stations, perforations 12 (in holders 8) are aligned with perforations 7 (of turntable 1) and articles 4 fall, by gravity, into indented removal trays 5, secured to conveyor chains 3 by bolts 13. For secure positioning of articles, indentations 14 in the removal trays 5, are of the same size as perforations 7 and 12, that is, slightly larger than articles 4.

Article holders 8 slide in guides 15 substantially radially of turntable 1 being pushed in predetermined timed sequence by actuators 24. Each of the actuators 24 consist of an arm 16, lever head 23, lever arm stud 26, and lever arm roller 22. Lever arm 16 rotates about fixed axis pin 17 when actuated by lever cam wheel 21. Both lever cam wheel 21 and locking cam wheel 19 are mounted on a continuously driven axle 20. Another example of actuator 24 is a solenoid (not shown). Locking pin 18, raised by locking cam wheel 19 on axle 20, cooperates with holes 11 in turntable 1 to lock turntable 1. This locking action is simultaneous with the sliding motion imparted to article holder 8 by lever head 23 and insures proper alignment of perforations 12 (in holders 8) with perforations 7 (of turntable 1) and indentations 14 in removal trays 5. Axle 20, driven by a motor (not shown) drives, through an externally timed magnetic slip clutch (not shown) on axle 20, belt 27 and conveyor axle 26. The geared conveyor drive wheel 27 drives chain belt conveyor 3 which, in turn, drives conveyor driven wheel 28. Through gears 29 and 30, turntable axle 31 is driven by driven wheel 28. By this arrangement continuously rotating axle 20 drives, in predetermined periodic and simultaneous rotation, conveyors 3 and turntable 1.

In operation, articles 4 are fed into the top of hopper 6. They fall onto turntable 1 and are inserted into two sets of perforations 7. Turntable 1 indexes clockwise to move articles in the perforation 7 to removal station 2 where the first of two adjacently mounted article holders 8 is slid along guides 15 by lever head 23. Simultaneously therewith, turntable 1 is locked by the insertion of locking pin 18 into hole 11. Articles 4, from the first set of perforations 7, fall by gravity through aligned perforations 7 and 12 and into indentations 14 in removal trays 5. Locking pin 18 is lowered, by further rotation of cam wheel 19, from hole 11 and turntable 1 continues its indexing rotation. After four indexing steps of 45° each, the second article holder 8 is in position over removal station 25. Another lever arm 16, with its affixed lever head 23, slides the second article holder 8 to align its perforations 12 with the second set of perforations 7 (of turntable 1), thereby causing articles 4 in such second holder to fall into indentations 14 in removal trays 5 at removal station 25. With this apparatus two separate processing lines may be simultaneously supplied with articles from a single source.

By suitable arrangement of the pattern, size and shape of perforations 7 (in turntable 1) and by similar arrangement of perforations 12 (in article holder 8) and indentations 14 (in removal trays 5) various patterns of articles and articles of various sizes and shapes may be laid down in removal trays 5.

Various modifications may be made in the specific embodiment of this invention shown and described and be within the scope thereof. For example, there may be more than two removal stations adjacent to the turntable.

What is claimed is:

1. In a perforated rotary turntable for transferring articles from one input station to a removal station, means to enable removal of articles from the turntable comprising a perforated plate, means for mounting the plate beneath and adjacent the table for carrying the plate with the table in the rotary motion and for permitting sliding motion of the plate substantially radially with respect to the table, and an actuator at the removal station for sliding the plate to align the plate and table perforations and thereby enable removal of articles from the table through the perforations to the removal station.

2. A device as claimed in claim 3 and further characterized in that the turntable is intermittently rotated, the actuators operate on different holders substantially simultaneously, the turntable has therein a plurality of locking holes, and a locking pin is moved into a locking hole by means operating simultaneously with operation of the actuators.

3. An article distributing device comprising a perforated turntable, means to rotate the turntable about its axis, a plurality of spring loaded perforated article holders disposed below the turntable and mounted to rotate with and slide substantially radially to the turntable, a plurality of actuators respectively positioned at separate removal stations adjacent the turntable, each actuator cooperating with a respective one of the article holders to slide the holder radially relative to the turntable to move the article holder so that the perforations of the holder are aligned with certain turntable perforations.

4. A device as claimed in claim 3 wherein a first and second of the plurality of actuators are disposed at an interval of substantially 180° relative to the surface of the table.

References Cited in the file of this patent

UNITED STATES PATENTS 2,859,855 Grafingholt _____ Nov. 11, 1958

FOREIGN PATENTS 575,325 Great Britain _____ Feb. 13, 1946